(12) United States Patent
Krizan et al.

(10) Patent No.: US 7,997,568 B2
(45) Date of Patent: Aug. 16, 2011

(54) ADJUSTABLE TRACK MOUNT BEAM SECURING DEVICE

(76) Inventors: Dennis Theodore Krizan, West Allis, WI (US); Jon T Erickson, Cedarburg, WI (US)

( * ) Notice: Subject to any disclaimer, the term of this patent is extended or adjusted under 35 U.S.C. 154(b) by 486 days.

(21) Appl. No.: 12/189,191

(22) Filed: Aug. 10, 2008

(65) Prior Publication Data

US 2010/0032880 A1   Feb. 11, 2010

(51) Int. Cl.
*B23Q 3/02* (2006.01)

(52) U.S. Cl. ................ 269/93; 269/60; 269/99; 269/95; 269/43

(58) Field of Classification Search ............ 269/60, 269/37, 43, 147, 266, 93, 94–98, 99
See application file for complete search history.

*Primary Examiner* — Lee D Wilson

(57) ABSTRACT

An adjustable clamping device to secure a tube to a track system.

7 Claims, 5 Drawing Sheets

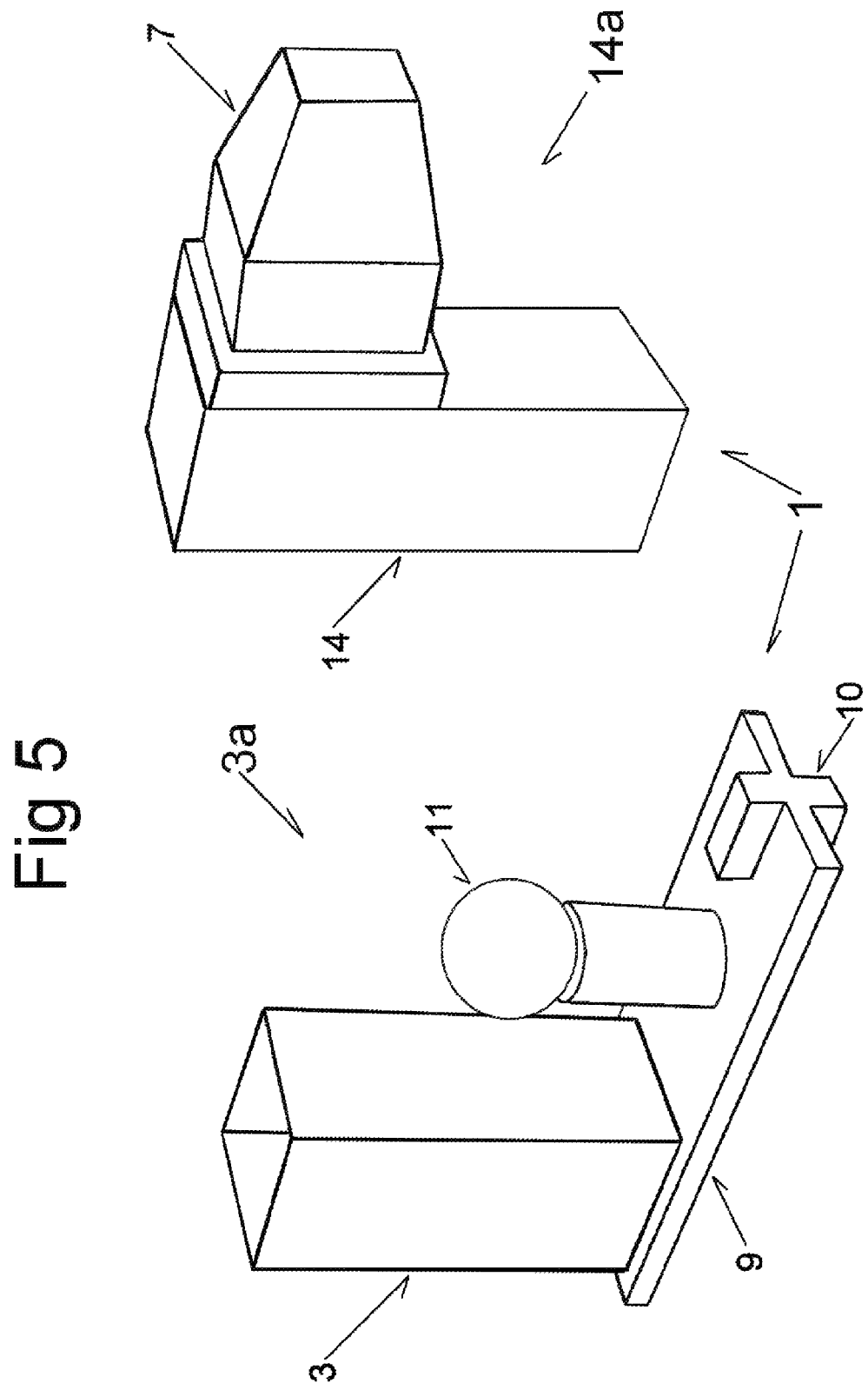

ADJUSTABLE TRACK MOUNT BEAM SECURING DEVICE

BACKGROUND OF THE INVENTION

The present invention relates to a clamping system to hold and secure a tube and whatever load is attached to the tube to an existing track system wherein one end is adjustable to clamp and release the tube from the fixed track mounted pin on the other end of the tube, for properly and safely securing and transporting fragile loads in a vehicle.

SUMMARY OF THE INVENTION

In order to rectify the existing disadvantages of the conventional or non existence of existing load clamping systems as described, the applicants have been consistently and continuously making efforts to develop and improve the type of securing and or clamping system required for this need. With the applicants' accumulated experience and intelligent skills in the field, the applicants devised a secure clamping system to securely hold a tube mounted load in place for ground, water, air or space transportation, too aid users in avoiding unnecessary damage to the load, keeping down losses and insurance claims. Keeping assembly to a minimum to reduce production and shipping costs.

BRIEF DESCRIPTIONS OF THE DRAWINGS

Figure 1:
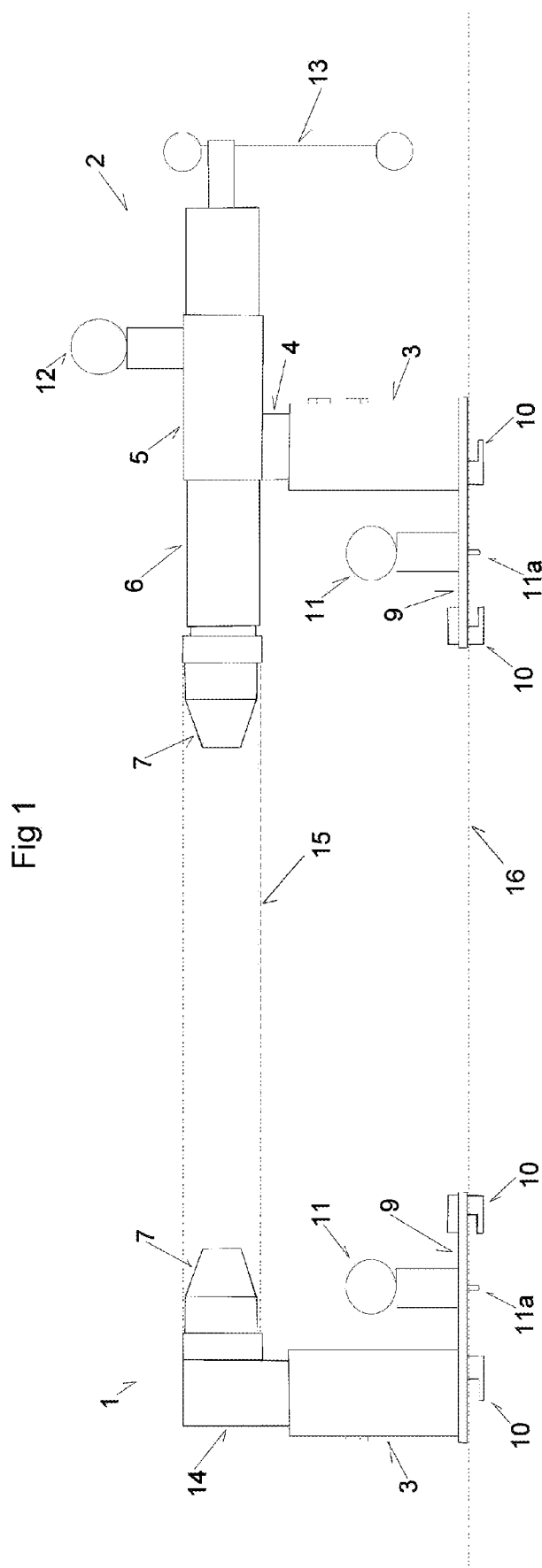

FIG. 1 is a side view of the adjustable track mount beam securing device, showing the track and load tube in use in dotted lines.

Figure 2:
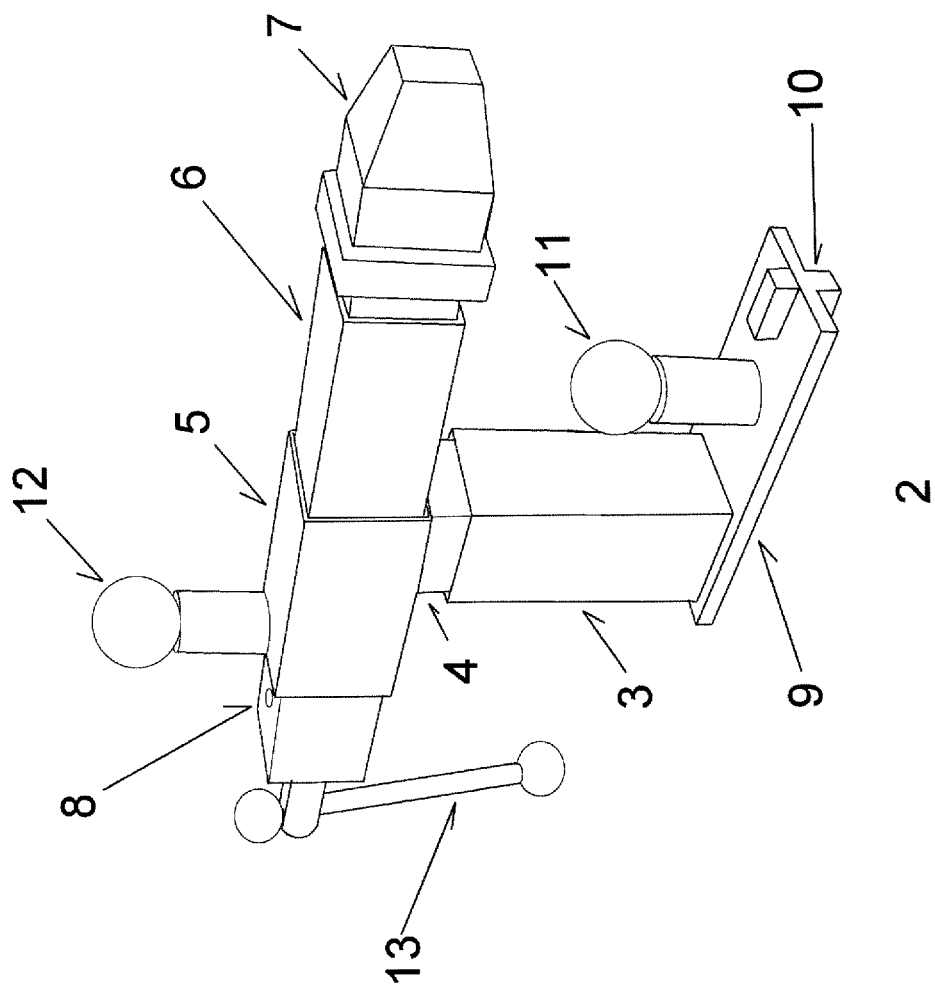
Figure 3:
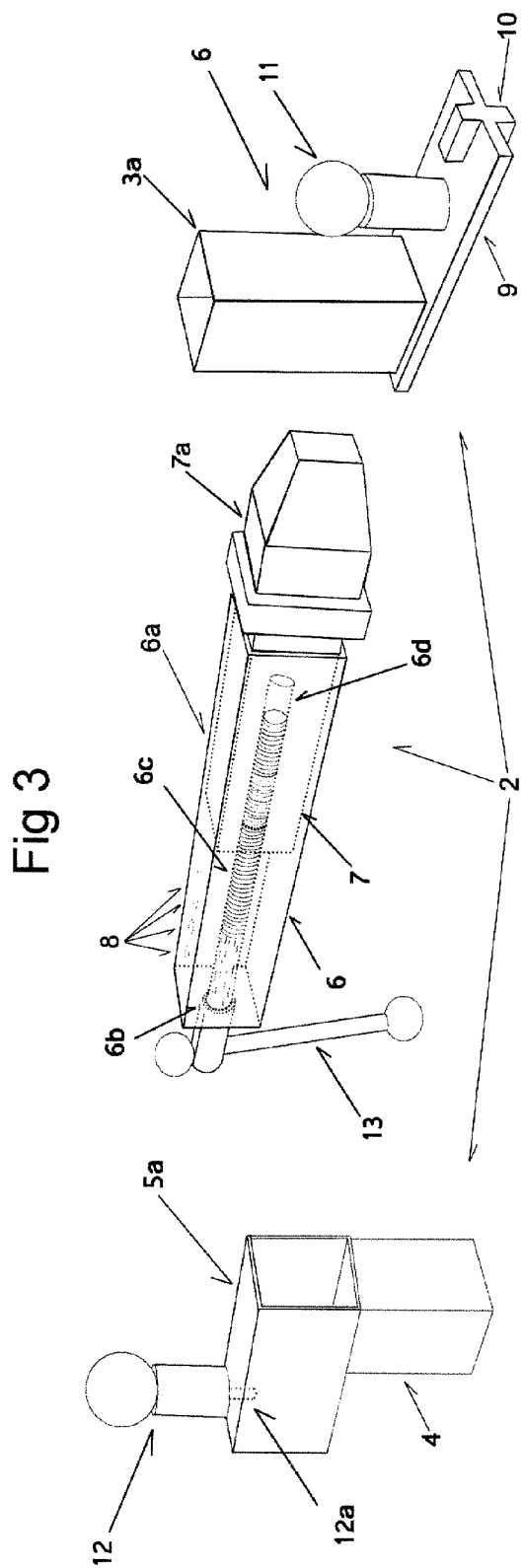
Figure 4:
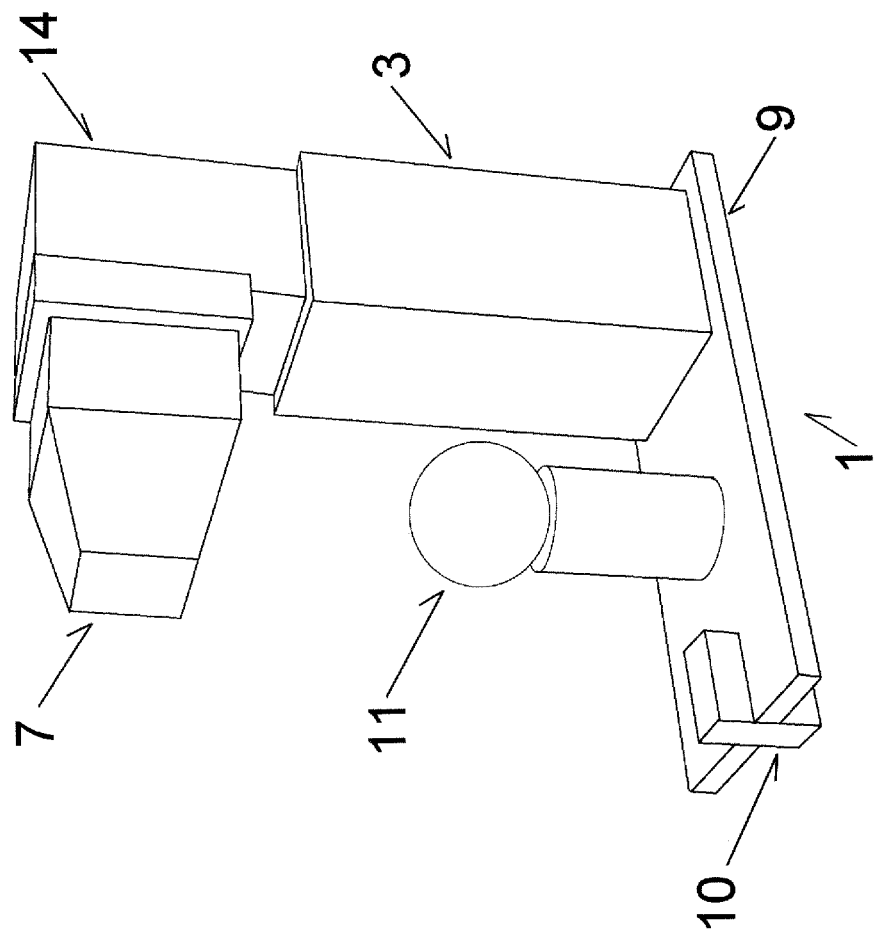

FIG. 2 is a three dimensional, perspective side view of the variable cone shaped tube insertion pin FIG. 3 is a three dimensional, perspective exploded side view of the variable cone shaped tube insertion pin FIG. 4 is a three dimensional, perspective side view of the fixed cone shaped tube insertion pin FIG. 5 is a three dimensional, perspective exploded side view of the fixed cone shaped tube insertion pin

DETAILED DESCRIPTION OF THE PREFERRED EMBODIMENT

Referring to FIG. 1: Shows the Vehicle track mount locking device in use, wherein the Fixed track mount locking pin (1) which is locked in place working as a stop for the tube (15) using Track interface keys (10) on track (16) being held in place by Track lock pin (11*a*) which can be released by Track lock pin release (11) and Adjustable track mount locking pin (2) which is locked in place on track (16) has been secured against opposite end of tube (15) to be locked in place.

Referring to FIG. 2: Shows the Adjustable track mount locking pin (2) Wherein Horizontal base plate (9) supporting Track interface key (10) is to lock into vehicle mounted track (16), Track lock pin release (11) for locking and releasing Adjustable track mount locking pin (2) to and from vehicle mounted track (16) and Vertical beam sleeve (3) extends vertically up to contain Coarse adjustable vertical beam (4) which can be raised or lowered within the Vertical beam sleeve (3) to the required locking height, that has Horizontal beam sleeve (5) attached, that has Coarse adjustable horizontal lock pin release (12) attached that inserts or retracts a locking pin into the Coarse adjustable horizontal lock pin holes (8) to lock or release Fine adjusting horizontal inner beam (6) to the required locking depth to coarsely insert or retract attached Cone shaped tube insertion pin (7) from tube (15) to be locked in place. At the rear of Fine adjusting horizontal inner beam (6) is Tube pin adjusting handle (13) to finely insert or retract the Cone shaped tube insertion pin (7) to or from tube (15) to be locked in place or released.

a. Referring to FIG. 3: Shows an exploded view of the Adjustable track mount locking pin (2) wherein (5*a*) shows the vertical beam—horizontal sleeve locking pin assembly, (12) shows detail of horizontal sleeve locking device, (12*a*) shows locking pin, (6) shows the Fine adjusting horizontal inner beam assembly (6*c*) shows threaded fine adjusting rod, (6*d*) shows threaded cavity within (7*a*) the variable isosceles trapezoidal tipped cone shaped insertion pin, (6*b*) shows stop on non treaded end of threaded adjusting rod to prevent rod from moving out of body of unit (6), (8) shown course adjusting horizontal locking holes for pin (12*a*), and (3*a*) shows Horizontal base, vertical beam sleeve, locking pin, track interface key assembly.

Referring to FIG. 4: Shows Fixed track mount locking pin (1) wherein Horizontal base plate (9) supporting Track interface key (10) is to lock into vehicle mounted track (16), Track lock pin release (11) for locking and releasing Fixed track mount locking pin (1) to and from vehicle mounted track (16) and Vertical beam sleeve (3) extends vertically up to contain Coarse adjustable vertical beam (14) which can be raised or lowered within the Vertical beam sleeve (3) to the required locking height, that has Cone shaped tube insertion pin (7) attached, that is used to insert into the Tube to be secured as a fixed stop.

Referring to FIG. 5: Shows an exploded view of the Fixed track mount locking pin (1) wherein (3*a*) shows Horizontal base, vertical beam sleeve, locking pin, track interface key assembly (14*a*) shows the Vertical beam Cone shaped tube insertion pin section.

Field of the Present Invention

The present invention relates to a clamping device to secure a load attached to a tube to an existing track system mounted in a ground, water, air or space transport vehicle. The clamping device is a novel, practical and safe means of securing a load attached to a tube, which has the advantages of easy operation, simple in construction and suitable for safely securing any type of load properly attached to the tube.

FIELD OF SEARCH

410/66,67,77,121  280/47.34,47.35,79.11,79.2,79.3,651, 652 410/77 410/80

REFERENCES CITED

U.S. Pat. No. 7,025,548 Krawczyk Apr. 11, 2006
U.S. Pat. No. 2,950,126 Armentrout Aug. 23, 1960
U.S. Pat. No. 3,210,038 Bader Oct. 5, 1965
U.S. Pat. No. 3,125,035 Loomis Mar. 17, 1964
U.S. Pat. No. 4,120,076 Lebre Oct. 17, 1978
U.S. Pat. No. 6,099,220 Poth Aug. 8, 2000
U.S. Pat. No. 4,200,046 Koliba Apr. 29, 1980
U.S. Pat. No. 3,593,387 Georgi Jul. 20, 1971
U.S. Pat. No. 3,612,466 Arnold Oct. 12, 1971
U.S. Pat. No. 5,137,405 Klein Aug. 11, 1992
U.S. Pat. No. 3,641,940 Evans Feb. 15, 1972
U.S. Pat. No. 4,234,278 Harshman Nov. 18, 1980

The invention claimed is:
1. A clamping device for securing a tube to a mounted track system, said clamping device comprising:

a first fixed isosceles trapezoidal cone shaped insertion pin connected to a beam assembly and a second variable isosceles trapezoidal cone shaped insertion pin connected to a beam assembly, each said pin having a variable vertical height beam sleeve to compensate for any needed deviation in required height, wherein said isosceles trapezoidal cone shaped insertion pins have a horizontal base plate, said base plate include a track interface key with projections and track locking release pin for securing to a track system, said second variable cone shaped insertion pin comprising a base plate and a fine adjustment handle at the rear of the variable horizontal isosceles trapezoidal cone shaped insertion pin of said beam assembly for applying a clamping pressure to secure or hold or release said bad tube into position and orientation to be secured against and onto first said fixed isosceles trapezoidal cone shaped insertion pin.

2. The clamping device according to claim 1, wherein said second variable isosceles trapezoidal cone shaped insertion pin connected to a beam assembly further comprises a track locking release pin for securing a track system.

3. The clamping device according to claim 1, wherein said second variable isosceles trapezoidal cone shaped insertion pin connected to a beam assembly further comprises inner and outer sleeves with a threaded screw connected said fine adjustment handle.

4. The clamping device according to claim 3, wherein said variable vertical height beam sleeve further comprises a horizontal beam sleeve connected to the a top of said variable vertical height with a adjustable horizontal lock pin release for adjustment of said inner and outer sleeves.

5. The clamping device according to claim 4, wherein said outer sleeve has adjustment lock pin holes.

6. The clamping device according to claim 1, wherein said second variable cone shaped insertion pin said base plate further comprises a track interface key with projections.

7. The clamping device according to claim 1, wherein said base plates of first and second cone shaped isosceles trapezoidal cones further comprises second spaced apart track interface key projections for added stability.

* * * * *